US008462141B2

(12) United States Patent
Mostinski et al.

(10) Patent No.: US 8,462,141 B2
(45) Date of Patent: Jun. 11, 2013

(54) UNIFIED MEMORY ARCHITECTURE AND DISPLAY CONTROLLER TO PREVENT DATA FEED UNDER-RUN

(75) Inventors: Roman Mostinski, Jerusalem (IL); Mikhail Bourgart, Modi'in (IL); Edward Vaiberman, Holon (IL)

(73) Assignee: Freescale Semiconductor, Inc., Austin, TX (US)

( * ) Notice: Subject to any disclaimer, the term of this patent is extended or adjusted under 35 U.S.C. 154(b) by 819 days.

(21) Appl. No.: 12/596,235

(22) PCT Filed: Apr. 26, 2007

(86) PCT No.: PCT/IB2007/051554

§ 371 (c)(1), (2), (4) Date: Oct. 16, 2009

(87) PCT Pub. No.: WO2008/132556

PCT Pub. Date: Nov. 6, 2008

(65) Prior Publication Data

US 2010/0073388 A1 Mar. 25, 2010

(51) Int. Cl.

*G06F 3/038* (2006.01)
*G06F 15/16* (2006.01)
*G09G 5/36* (2006.01)

(52) U.S. Cl.

USPC ............................ 345/204; 345/558; 345/502

(58) Field of Classification Search

None

See application file for complete search history.

(56) References Cited

U.S. PATENT DOCUMENTS

| | | | | |
|---|---|---|---|---|
| 5,488,385 | A | 1/1996 | Singhal et al. | |
| 5,764,201 | A | 6/1998 | Ranganathan | |
| 5,867,140 | A * | 2/1999 | Rader | 345/98 |
| 5,963,192 | A * | 10/1999 | Wong et al. | 345/593 |
| 6,490,534 | B1 * | 12/2002 | Pfister | 702/94 |
| 2003/0142058 | A1 | 7/2003 | Maghielse | |
| 2004/0207644 | A1 | 10/2004 | MacInnis et al. | |
| 2005/0184993 | A1 | 8/2005 | Ludwin et al. | |
| 2008/0174606 | A1 * | 7/2008 | Rengarajan et al. | 345/531 |

FOREIGN PATENT DOCUMENTS

GB 2319878 A 6/1998

OTHER PUBLICATIONS

International Search Report and Written Opinion correlating to PCT/IB2007/051554 dated Nov. 12, 2007.

* cited by examiner

*Primary Examiner* — Tize Ma
*Assistant Examiner* — Yingchun He

(57) ABSTRACT

A display controller for controlling data in an isochronous display where fluctuation of data feed latency occurs, the display controller including an input memory which receives pixel data and transmits the pixel data through a main route and a secondary route; wherein pixel data is transmitted through the main route and is processed for delivery to the display in a predetermined manner; characterized in that the secondary route comprises a memory for storing a two-dimensional section of the pixel data that corresponds at least in part to the pixel data being transmitted through the main route at that time; further characterized in that the display controller includes a detector for identifying a data feed latency event and in response there to switching the transmission of the pixel data to the secondary route and processing the pixel data through secondary route for delivery to the display such that when a data feed latency event occurs the stored two-dimensional section of the pixel data from the secondary route is displayed on the display.

13 Claims, 3 Drawing Sheets

UNIFIED MEMORY ARCHITECTURE AND DISPLAY CONTROLLER TO PREVENT DATA FEED UNDER-RUN

FIELD OF THE INVENTION

This invention relates to improvements in or relating to display controller architecture, particularly but not exclusively when dealing with variable data feeds.

BACKGROUND OF THE INVENTION

There are many environments in which isochronous (synchronous) displays exist. For example LCD and CRT displays may be isochronous. Isochronous displays require data to be displayed in a synchronous manner, with a refresh process. Isochronous displays cannot tolerate delays in the arrival of data. These situations are known as data under-run conditions. Data under-run conditions may cause displays to become corrupt with visibly bad pixels and sometimes even bad rows or fields. Accordingly, there is a requirement to provide a display controller which overcomes this problem. This is particularly the case with resource limited and cost limited handheld devices, but the problem exists with any isochronous display.

There are a number of solutions that have been proposed to this problem. One such proposal is disclosed in the US 2003/0142058 (Inventor: Maghielse) and makes use of a first in first out (FIFO) type latency buffer. When the FIFO under-runs the display controller either stops or throttles the display pixel clocks; or repeats the last pixel data keeping the clock running. FIG. 1 shows an example of a display controller which includes a direct memory access (DMA) engine 100. This passes data to an input FIFO 102. The output from the input FIFO is passed through a palette random access memory (RAM) 106 and a dithering engine 108 to a formatter 110. The output data is then passed to the pins via an output FIFO 112.

This has a number of disadvantages, one disadvantage being that not all displays will tolerate the stalling of the pixel clock. In addition, long repetition time of the last pixel can be visible in most cases and thereby does not solve the problem of "bad pixels".

In order to minimise costs of hand held and mobile devices a number of proposals have been made which adopt a system architecture and unified memory and avoid using separate memory for display refresh buffers. Because of this the display refresh process depends not only on the display controller access to memory but also on other device activities such as the CPU, the DMA and so on. The access by other devices may cause fluctuating memory latency. It is this fluctuating memory latency that can also cause the data under-run in a display controller FIFO.

One object of the present invention is to provide an efficient method of feeding data to a display. Another object of the present invention is to reduce visible display corruption. A still further object to the present invention is to provide a display controller architecture which overcomes at least some of the disadvantages of the prior art.

SUMMARY OF THE INVENTION

The present invention provides a method and system as described in the accompanying claims.

BRIEF DESCRIPTION OF THE DRAWINGS

Reference will now be made, by way of example, to the accompanying drawings, in which.

DETAILED DESCRIPTION OF THE PREFERRED EMBODIMENTS

Figure 1:
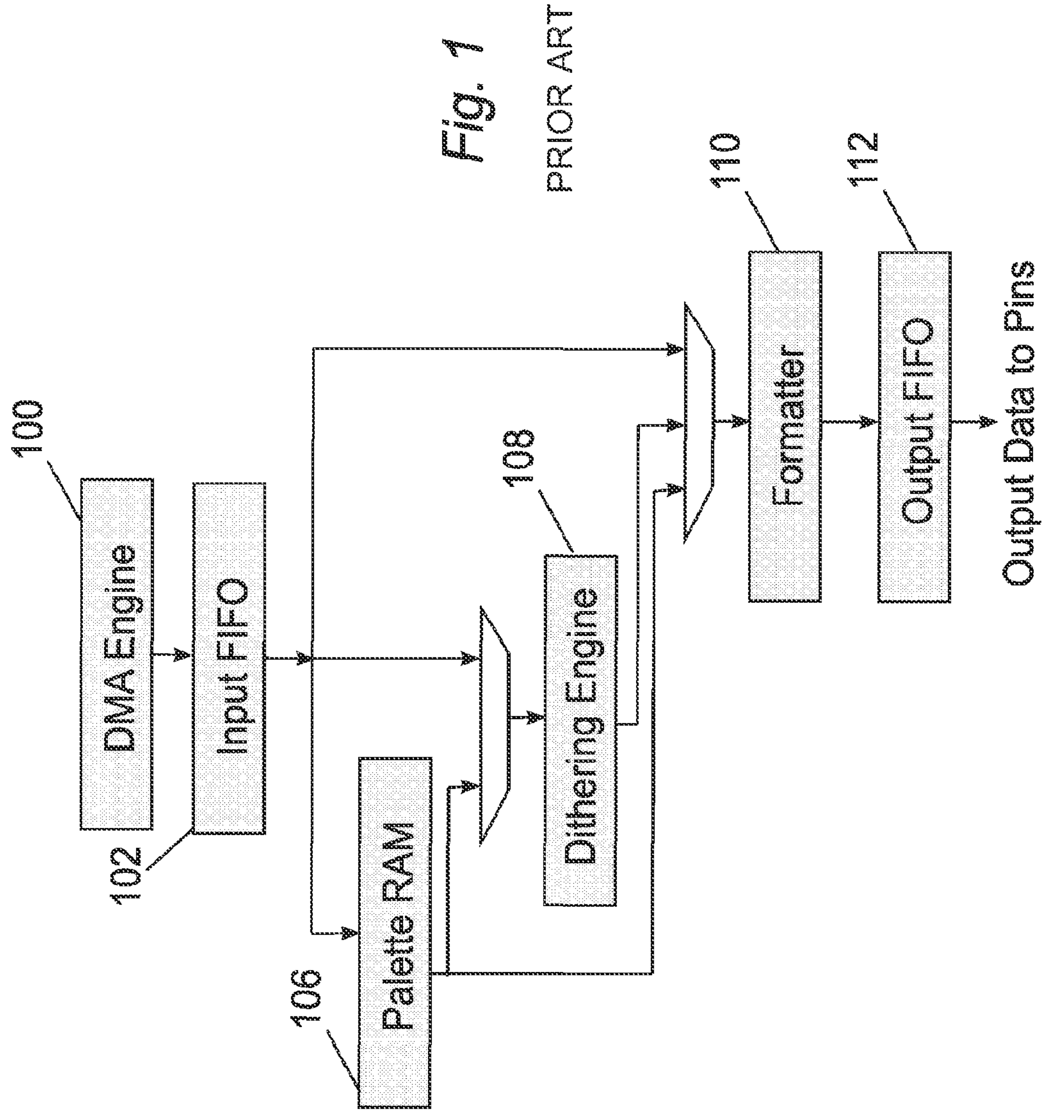
Fig. 1 PRIOR ART
FIG. 1 is a block diagram of a typical display controller in accordance with the prior art.
Figure 2:
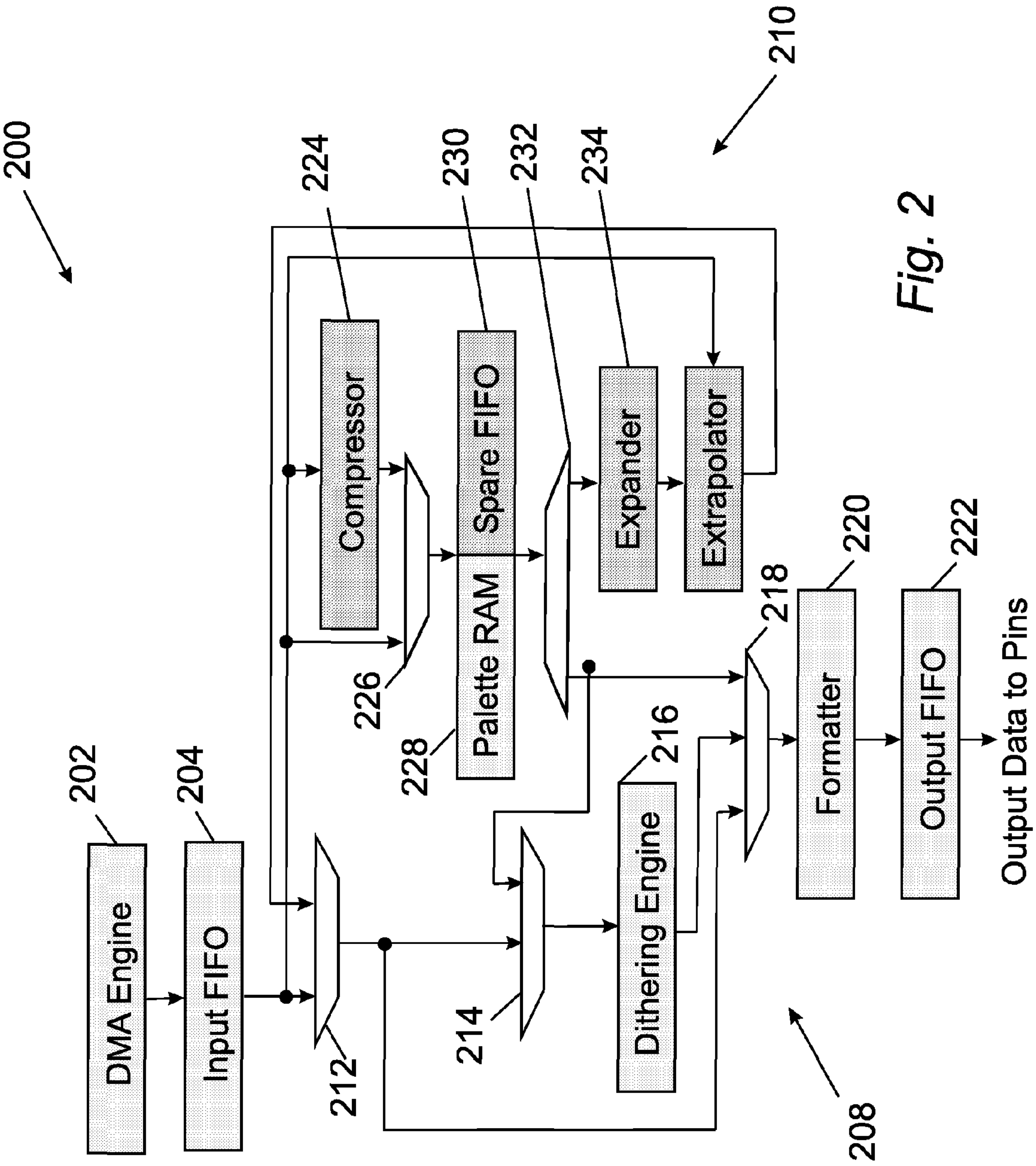
FIG. 2 is a block diagram of a display controller architecture in accordance with one embodiment of the invention, given by way of example.

Referring now to FIG. 2 a display controller architecture is shown generally at 200. The display controller includes a direct memory access (DMA) engine 202 which is connected to an input FIFO 204. The input FIFO is connected to two circuit parts, the left-hand side (or the main pipeline or route) 208 and a right-hand side (or the secondary pipeline or route) 210. The left-hand side 208 includes two combiners 212, 214 and a dithering engine 216. The output from the dithering engine is passed through a third combiner 218 to a formatter 220. The output from the formatter goes to an output FIFO 222 and then provides the output data to the pins. This part of the processing circuit is substantially similar to the prior art and functions in a similar way there to.

The right-hand side 210 includes a compressor 224 and a combiner 226. The output from the combiner passes into a combined palette RAM 228 and a spare FIFO 230. The output from the combined palette ram and spare FIFO (details of which will be described in greater detail below) is passed through a divider 232. The output from the divider may be passed either through the third combiner 218 or into an expander 234. This is then passed into an extrapolator 236 and the output thereof is passed to the first combiner 212. The details of how this operates will now be described in more detail.

The pixels in a real display image have a high degree of two-dimensional correlation. The visual display corruption will be lower if the two-dimensional extrapolation is used instead of the last pixel repetition as is utilised in the prior art. The last pixel repetition is actually a simple one-dimensional extrapolation. This invention deals with the issue of providing two-dimensional extrapolation. This is achieved by storing a whole line of pixel data for the line before the line it is currently being processed. This storage is effected locally to avoid the need for additional access to an external memory. This is due to the fact that access to the external memories would be complicated to implement, time-consuming, power consuming and may introduced too many delays.

In accordance with the present invention of the additional local memory is provided by the combination palette RAM and spare FIFO. The palette RAM includes a lookup table that is generally not used in cases of high colour depth when memory bandwidth limitations become an issue. When there are no memory issues the palette RAM is used to augment the colour of the resultant image. In the present invention the lookup table in the palette RAM is used to store the previous row of pixel data. By use of compression and decompression techniques the lookup table may store multiple rows of pixel data or other parts of the image as the case may be due to the fact that the compression reduces the size of information constituting a row of pixel data. Compression rates of between 20% and 50% can be achieved by using run length encoding (RLE). It will be appreciated that other types of encoding and compression may be used to reduce the amount of storage space required for a specific amount of information, to be stored for later use if a data latency event occurs.

The manner in which the present invention works will now be described. The DMA engine fetches data from the refresh buffer, located in the system memory and passes the data to the input FIFO. The data from the input FIFO is then channelled down both the right-hand side 210 and the left-hand side (the main display pipeline) 208. The main display pipeline consists of the dithering engine, formatter and output FIFO as previously described. With respect to the data channelled down the right-hand side 210 the data is compressed and then stored in the combination palette RAM and spare FIFO. As the data is in compressed form the amount of memory required is optimised. A display controller (not shown per se) determines what data should be output and from which FIFO. When the system is operating normally and a steady flow of synchronous data is being received the display controller passes the data from the input FIFO to the output FIFO for output to the data pins.

If the input FIFO experiences an under-run condition the display controller switches to data sourcing the data for the output FIFO from the left-hand side 208 to the right-hand side 210, in particular from the combination palette RAM and spare FIFO (228, 230). When this occurs data is output from the spare FIFO and undergoes decompression in the expander (or decompressor) and passes through an extrapolator which ensures the synchronisation of the data from the spare FIFO with the normal flow of data from the left-hand side. In other words, when there is no longer any data from the left-hand side, data from the spare FIFO is displayed.

As an alternative, the data may be read from the spare FIFO and sent to the formatter if the input FIFO experiences an under-run condition. This means that is less delay in switching from the LHS to the RHS, but requires more access to the spare FIFO.

The dataflow from the spare FIFO continues until the system memory becomes available again. If this occurs midway through a row of pixel data the display controller can immediately switch to data from the input FIFO (and the left-hand side) and returns interpolated values to the spare FIFO. This ensures that if there is a further under-run condition there is still date in the spare FIFO which can be used.

Whenever the system memory becomes available the display controller immediately displays pixel data from the start position of that available data and skips any pixel data from the spare FIFO which it has not yet read.

Figure 3:
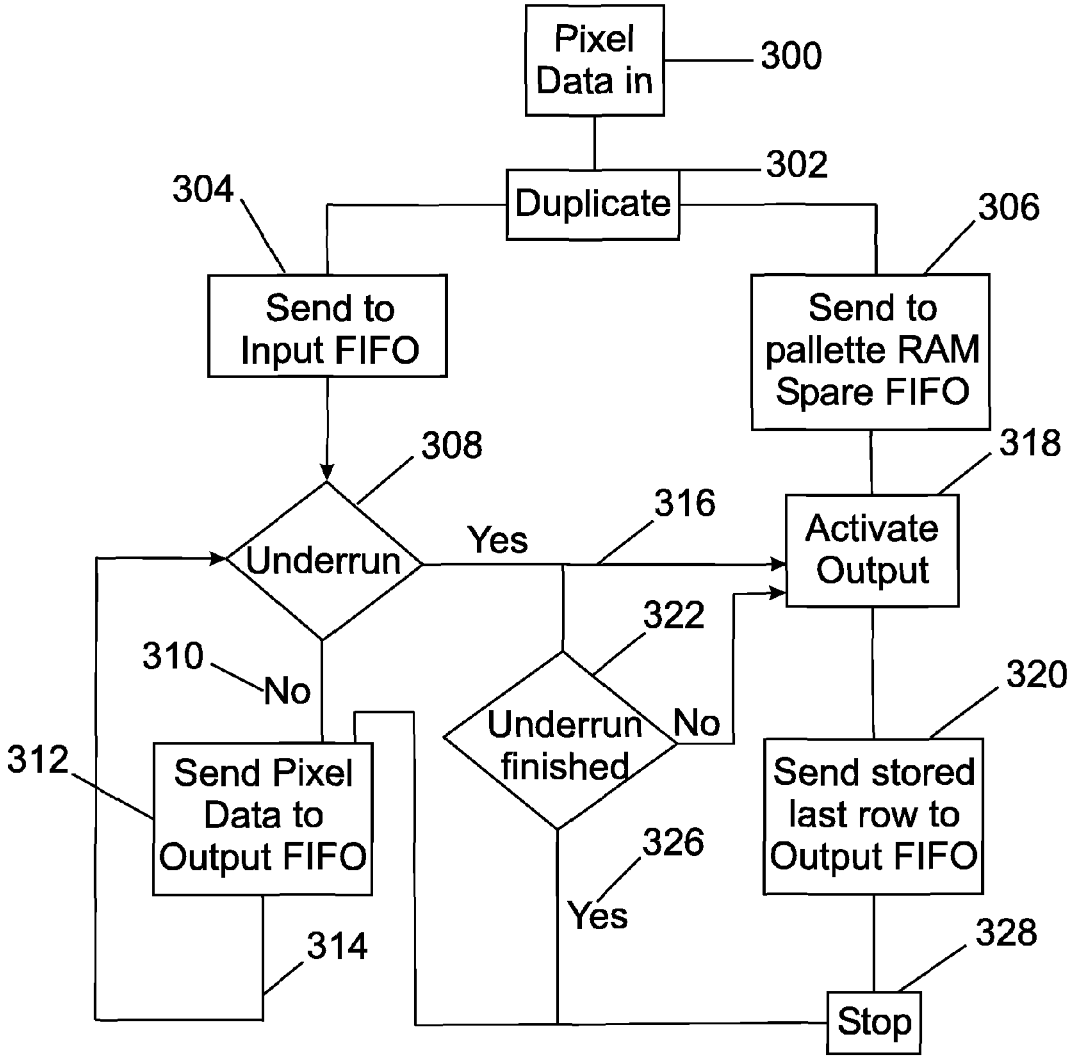
FIG. 3 is a flow chart of the method steps in accordance with one embodiment of the invention, given by way of example.

FIG. 3 shows that any flowcharts of the method steps carried out within the present invention and by the display controller. Pixel data is received by the DMA engine (step 300) and is duplicated (step 302). One version of the data is sent to the input FIFO (step 304) and the second version of the data is sent to the combination parallel RAM spare FIFO (step 306). At a certain point in time, either as a result of lack of available pixel data or perhaps on a temporary basis the determination is made as to whether there is an under-run condition (step 308). If no under-run condition is detected (310) the pixel data from the input FIFO is sent to the output FIFO for onward transmission to the data pins (step 312). The transmission of data continues in this manner until an under-run condition is detected. The process reverts to step 308 in a predetermined manner (step 314).

If an under-run condition is detected (yes, 316) and output is activated from the palette RAM spare FIFO combination (step 318). This causes the last row of pixel data to be passed to the output FIFO for onward transmission to the data pins (step 320). At the same time when the under-run condition is detected a further determination is made to determine whether the under-run condition is finished (step 322). If the under-run condition has finished (yes, 326) the output of stored last row pixel data to the output FIFO is stopped (step 328). At the same time pixel data is sent from the input FIFO to the output FIFO for onward transmission to the data pins (step 312).

It will be appreciated that the present invention can be implemented in any situation where a synchronous display of data is required. Different types of compression and decompression could be used and the invention is not limited to RLE. In addition different types of extrapolation could also be used and is not limited to be by linear or two-dimensional extrapolation indicated in the example. Also it is not necessary that a line of data is stored in the memory, instead a different two-dimensional section of data maybe stored instead.

It will further be appreciated that the local memory (in this example the combined palette RAM and spare FIFO) can take any appropriate form and may be provided by another memory elements in the device as a whole or otherwise. The memory need not be limited to a FIFO, but may be another type of memory which can be accessed to provide the required pixel data in the required sequence.

It will be still further appreciated that the palette RAM spare FIFO combination (or any other appropriate memory) could be used for devices where there are more than one stream of pixel data. For example a device with a dual display may use only one palette RAM and spare FIFO combination for two main transmission tracks.

This invention has the effect of alleviating the visible effect of latency buffer under-run conditions. This is achieved by reusing the FIFO and a colour lookup table, which reside in the display controller to store compressed data from previous scan lines. In addition missing pixels are reconstructed using two-dimensional spatial correlation of pixel data and pixel data available from previous scan lines and current scan lines. The FIFO need not be enlarged for this task, unlike the circumstances with the prior art. In addition the additional hardware required is of the minimum which is particularly important in the cost sensitive handheld device environment.

Various other alternatives to the example shown will be appreciated to be included within the scope of the present invention.

The invention claimed is:

1. A display controller for controlling data in an isochronous display where fluctuation of data feed latency occurs, the display controller comprising:

an input memory which receives at an input of the input memory pixel data and transmits at an output of the input memory the pixel data through a main route and a secondary route; wherein, when in operation pixel data is transmitted through the main route and is processed for delivery to the display in a predetermined manner;

the secondary route comprises a secondary memory for storing a two-dimensional section of the pixel data that corresponds at least in part to the pixel data being transmitted through the main route at that time;

the display controller further comprises a detector for identifying a data feed latency event, and, in response thereto switching the transmission of the pixel data to the secondary route and processing the pixel data through the secondary route for delivery to the display such that when a data feed latency event occurs, causing missing pixel data in the main route, the stored two-dimensional section of the pixel data from the secondary route is displayed on the display to provide a two dimensional extrapolation to take the place of the missing pixel data;

wherein the secondary route comprises an encoder for encoding on a line by line basis the pixel data and a decoder which can decode the stored encoded pixel data when required, and wherein the secondary memory stores encoded data: and wherein the decoder comprises an expander and an extrapolator, the extrapolator to receive at a first input of the extrapolator pixel data output from the expander and to receive at a second input of the extrapolator pixel data output from the input memory, wherein the extrapolation is based on the pixel data received at the first input of the extrapolator and the second input of the extrapolator.

2. A display controller as claimed in claim 1, wherein the secondary memory stores at least one line of pixel data that corresponds to the pixel data being transmitted through the main route at that time.

3. A display controller as claimed in claim 2, wherein the secondary memory is provided by an already existing memory within the display controller.

4. A display controller as claimed in claim 1, wherein the encoder comprises a compressor.

5. A display controller as claimed in claim 1, wherein the secondary memory comprises a FIFO.

6. A display controller as claimed in claim 1, wherein the secondary memory is provided by an already existing memory within the display controller.

7. A display controller as claimed in claim 6, wherein the secondary memory is provided by a palette RAM.

8. A display controller as claimed in claim 7, wherein the palette RAM data to be selectively routed from an output of the palette RAM through a portion of the main route and processed for delivery to the display.

9. A display controller as claimed in claim 1, wherein the extrapolated pixel data to be selectively routed from an output of the extrapolator through the main route and processed for delivery to the display.

10. A method for controlling data in an isochronous display where fluctuation of data feed latency occurs, the method comprising:

receiving pixel data from an input memory;

transmitting the received pixel data through a main route and a secondary route, processing pixel data transmitted through the main route for delivery to the display in a predetermined manner;

storing in a memory in the second route a two-dimensional section of the pixel data that corresponds at least in part to the pixel data being transmitted through the main route at that time;

identifying a data feed latency event;

switching the transmission of the pixel data to the secondary route; and processing the pixel data through the secondary route for delivery to the display such that when a data feed latency event occurs, causing missing pixel data in the main route, the stored two-dimensional section of the pixel data from the secondary route is displayed on the display to provide a two-dimensional extrapolation to take the place of the missing pixel data;

wherein the secondary route comprises an encoder for encoding on a line by line basis the pixel data and a decoder which can decode encoded pixel data when required, and wherein a secondary memory stores encoded data; and wherein the decoder comprises an expander and an extrapolator, the extrapolator to receive at a first input of the extrapolator pixel data output from the expander and to receive at a second input of the extrapolator pixel data output from the input memory, wherein the extrapolation is based on the pixel data received at the first input of the extrapolator and the second input of the extrapolator.

11. The method of claim 10, wherein the step of storing comprises storing a line of pixel data corresponding to the pixel data being transmitted through the main route at that time.

12. A non-transitory computer readable medium having a computer program stored thereon, the computer program comprising instructions that when said computer program is executed on a computer system carries out a method for controlling data in an isochronous display where fluctuation of data feed latency occurs, the method comprising:

receiving pixel data from an input memory;

transmitting the received pixel data through a main route and a secondary route;

processing pixel data transmitted through the main route for delivery to the display in a predetermined manner;

storing in a memory in the second route a two-dimensional section of the pixel data that corresponds at least in part to the pixel data being transmitted through the main route at that time;—identifying a data feed latency event;

switching the transmission of the pixel data to the secondary route; and processing the pixel data through the secondary route for delivery to the display such that when a data feed latency event occurs, causing missing pixel data in the main route, the stored two-dimensional section of the pixel data from the secondary route is displayed on the display to provide a two-dimensional extrapolation to take the place of the missing pixel data;

wherein the secondary route comprises an encoder for encoding on a line by line basis the pixel data and a decoder which can decode encoded pixel data when required, and wherein a secondary memory stores encoded data: and wherein the decoder comprises an expander and an extrapolator, the extrapolator to receive at a first input of the extrapolator pixel data output from the expander and to receive at a second input of the extrapolator pixel data output from the input memory, wherein the extrapolation is based on the pixel data received at the first input of the extrapolator and the second input of the extrapolator.

13. The non-transitory computer readable medium of claim 12, wherein the secondary memory is provided by an already existing memory within the display controller.

* * * * *